United States Patent
Oyama

(10) Patent No.: US 10,491,835 B2
(45) Date of Patent: Nov. 26, 2019

(54) IMAGING APPARATUS, METHOD FOR CONTROLLING IMAGING APPARATUS, METHOD FOR CONTROLLING DISPLAY CONTROL APPARATUS, AND METHOD FOR CONTROLLING RECORDING APPARATUS

(71) Applicant: CANON KABUSHIKI KAISHA, Tokyo (JP)

(72) Inventor: Yasufumi Oyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 15/108,206

(22) PCT Filed: Dec. 5, 2014

(86) PCT No.: PCT/JP2014/006110
§ 371 (c)(1),
(2) Date: Jun. 24, 2016

(87) PCT Pub. No.: WO2015/098006
PCT Pub. Date: Jul. 2, 2015

(65) Prior Publication Data
US 2016/0330383 A1 Nov. 10, 2016

(30) Foreign Application Priority Data

Dec. 25, 2013 (JP) .................................. 2013-267155
Oct. 15, 2014 (JP) .................................. 2014-210839

(51) Int. Cl.
*H04N 5/232* (2006.01)
*H04N 5/225* (2006.01)
(Continued)

(52) U.S. Cl.
CPC ........... *H04N 5/2621* (2013.01); *G03B 15/00* (2013.01); *G03B 17/00* (2013.01); *H04N 5/2253* (2013.01);
(Continued)

(58) Field of Classification Search
CPC .... H04N 5/2621; H04N 5/265; H04N 5/7605; H04N 5/23212; H04N 5/2253;
(Continued)

(56) References Cited

U.S. PATENT DOCUMENTS

2003/0117501 A1* 6/2003 Shirakawa ........... H04N 5/2251
348/218.1
2010/0141681 A1* 6/2010 Fujii ........................ G09G 5/006
345/649
(Continued)

FOREIGN PATENT DOCUMENTS

CN 1633136 A 6/2005
CN 101639933 A 2/2010
(Continued)

*Primary Examiner* — Mekonnen D Dagnew
(74) *Attorney, Agent, or Firm* — Canon U.S.A., Inc. IP Division

(57) ABSTRACT

An imaging apparatus (100) includes a first imaging unit (13), a second imaging unit (103) configured to image an object in an opposite direction from the first imaging unit, a detection unit (44) configured to detect an orientation of the imaging apparatus, and a control unit (50) configured to perform control for displaying an image captured by the first imaging unit and an image captured by the second imaging unit on a display unit (28) at the same time. The control unit performs control so that the image captured by the second imaging unit is displayed after being rotated if the detection unit detects that the orientation of the imaging apparatus is a predetermined orientation, in a case where the image captured by the second imaging unit is displayed together with the image captured by the first imaging unit without being reversed by a mirror image reversal.

18 Claims, 11 Drawing Sheets

(51) Int. Cl.
*H04N 5/262* (2006.01)
*G03B 15/00* (2006.01)
*G03B 17/00* (2006.01)
*H04N 5/235* (2006.01)
*H04N 5/265* (2006.01)
*H04N 5/369* (2011.01)
*H04N 5/378* (2011.01)
*H04N 5/76* (2006.01)
*H04N 5/907* (2006.01)

(52) U.S. Cl.
CPC ......... *H04N 5/2258* (2013.01); *H04N 5/2353* (2013.01); *H04N 5/2355* (2013.01); *H04N 5/23212* (2013.01); *H04N 5/23293* (2013.01); *H04N 5/265* (2013.01); *H04N 5/2628* (2013.01); *H04N 5/369* (2013.01); *H04N 5/378* (2013.01); *H04N 5/7605* (2013.01); *H04N 5/907* (2013.01); *G06T 2207/30244* (2013.01)

(58) Field of Classification Search
CPC .... H04N 5/907; H04N 5/2353; H04N 5/2628; H04N 5/369; H04N 5/378; H04N 5/2355; H04N 5/23293; H04N 5/2258
See application file for complete search history.

(56) References Cited

U.S. PATENT DOCUMENTS

| | | | |
|---|---|---|---|
| 2012/0218431 A1 | 8/2012 | Matsuoto et al. | |
| 2013/0128078 A1 | 5/2013 | Song | |
| 2015/0002688 A1* | 1/2015 | Baldwin | H04N 5/23203 348/211.9 |
| 2015/0049234 A1* | 2/2015 | Jung | H04N 5/2258 348/333.05 |

FOREIGN PATENT DOCUMENTS

| | | |
|---|---|---|
| JP | 2004147046 A | 5/2004 |
| JP | 2005094741 A | 4/2005 |
| JP | 2007243241 A | 9/2007 |
| JP | 3154529 U | 9/2009 |
| JP | 2009542059 A | 11/2009 |
| JP | 2010083337 A | 4/2010 |
| KR | 20080091631 A | 10/2008 |
| WO | 2013/136607 A1 | 9/2013 |

\* cited by examiner

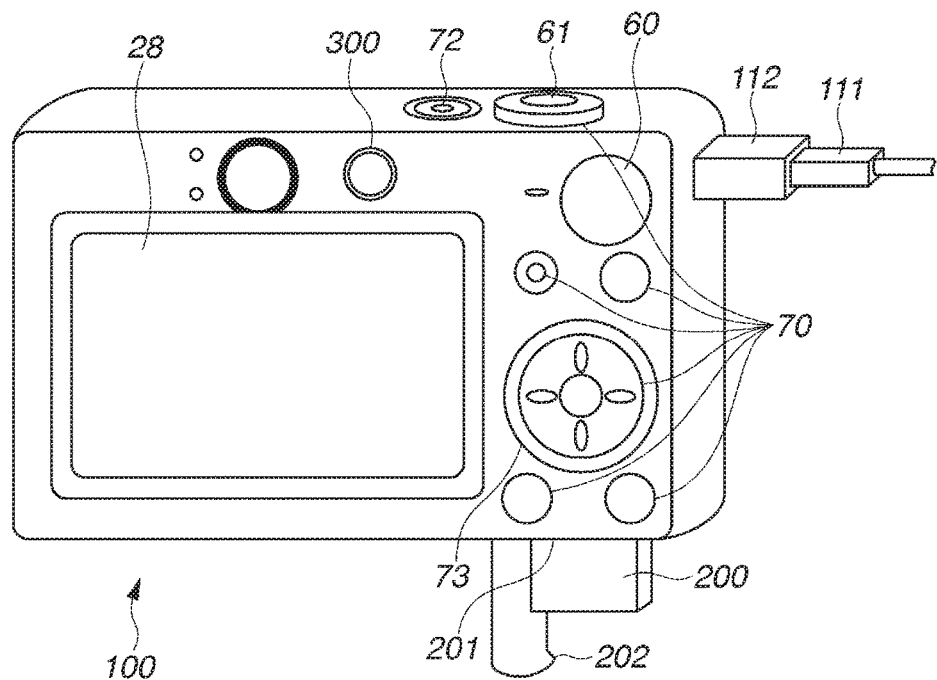
[Fig. 1]

[Fig. 2]
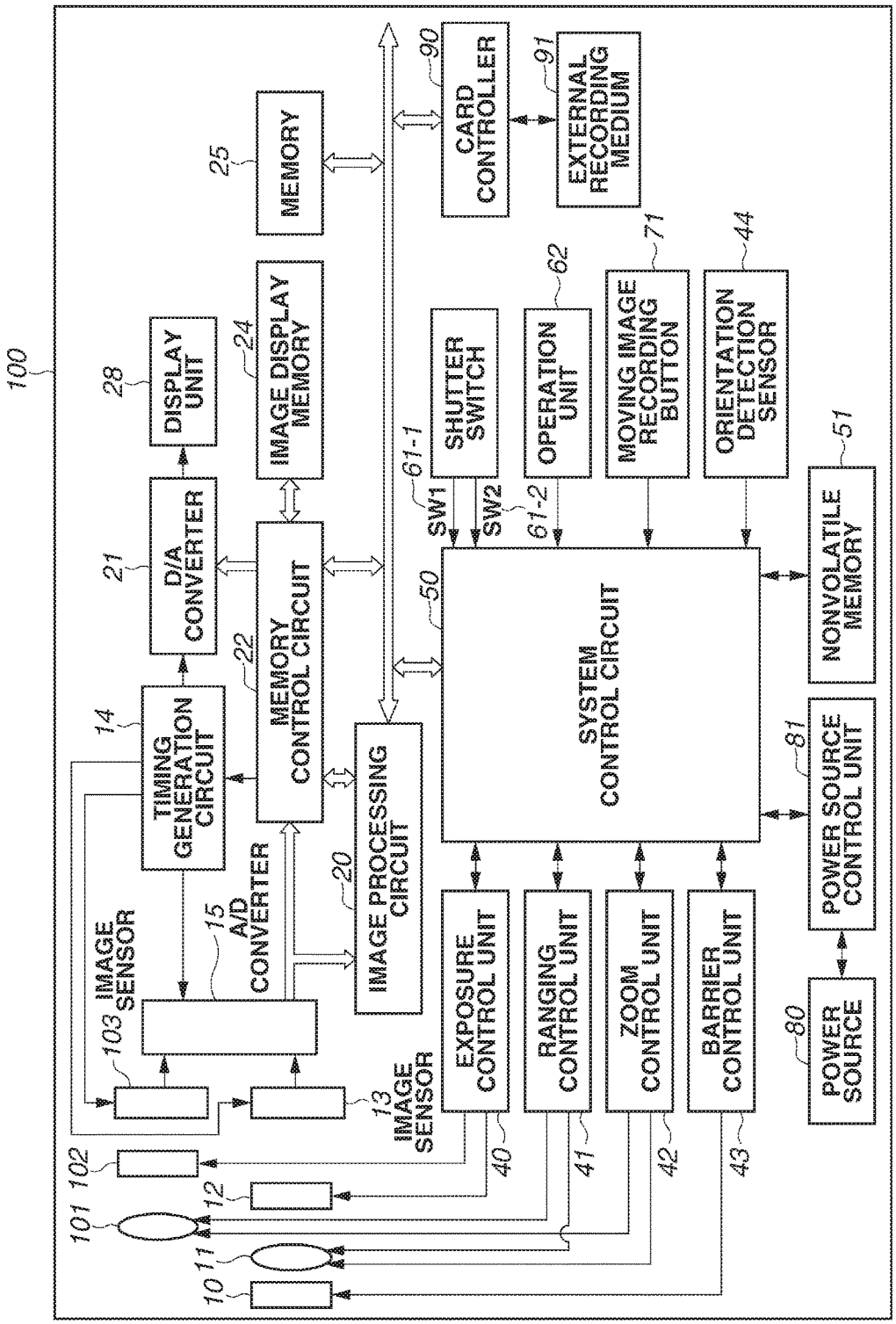

[Fig. 3]
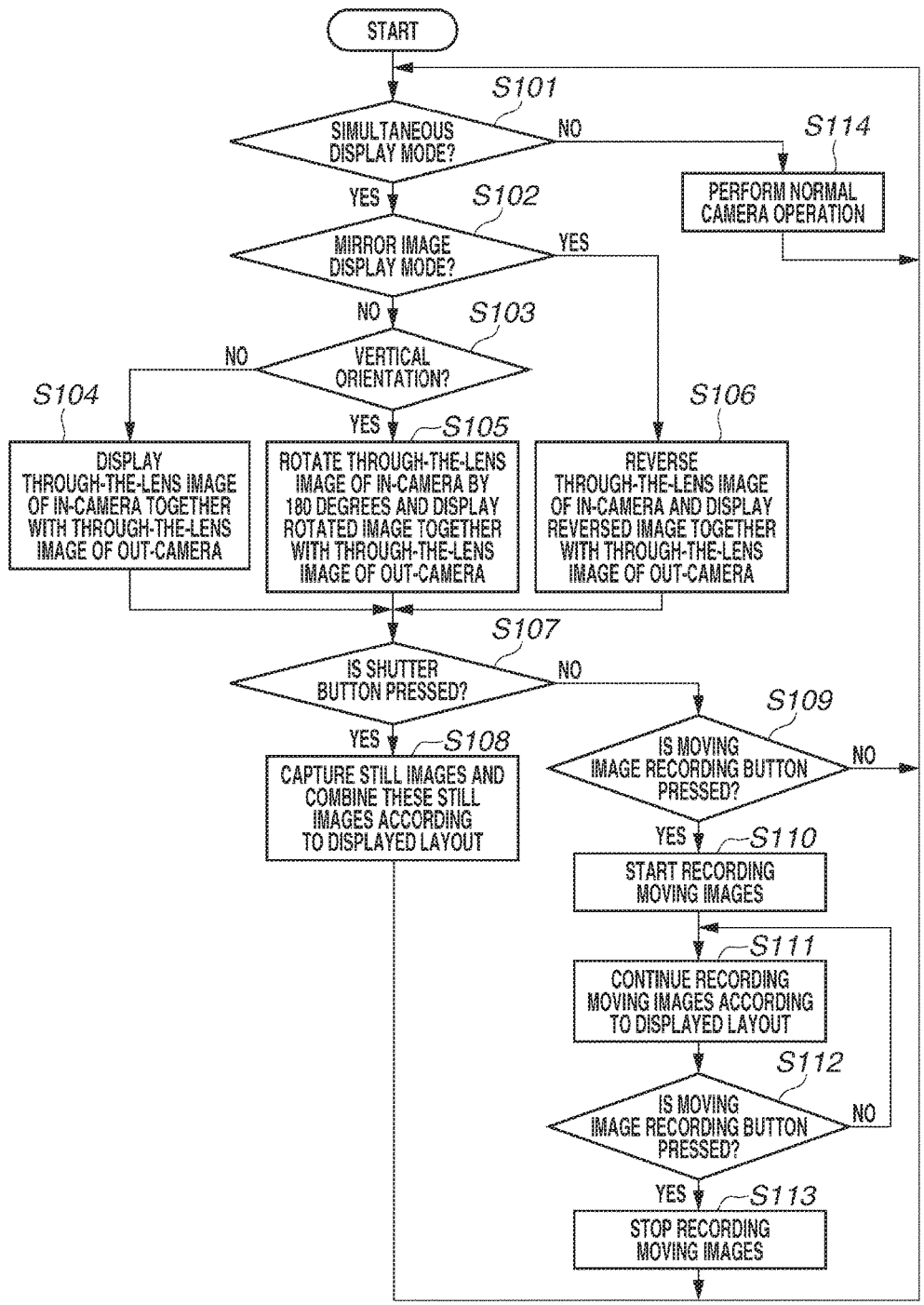

[Fig. 4]
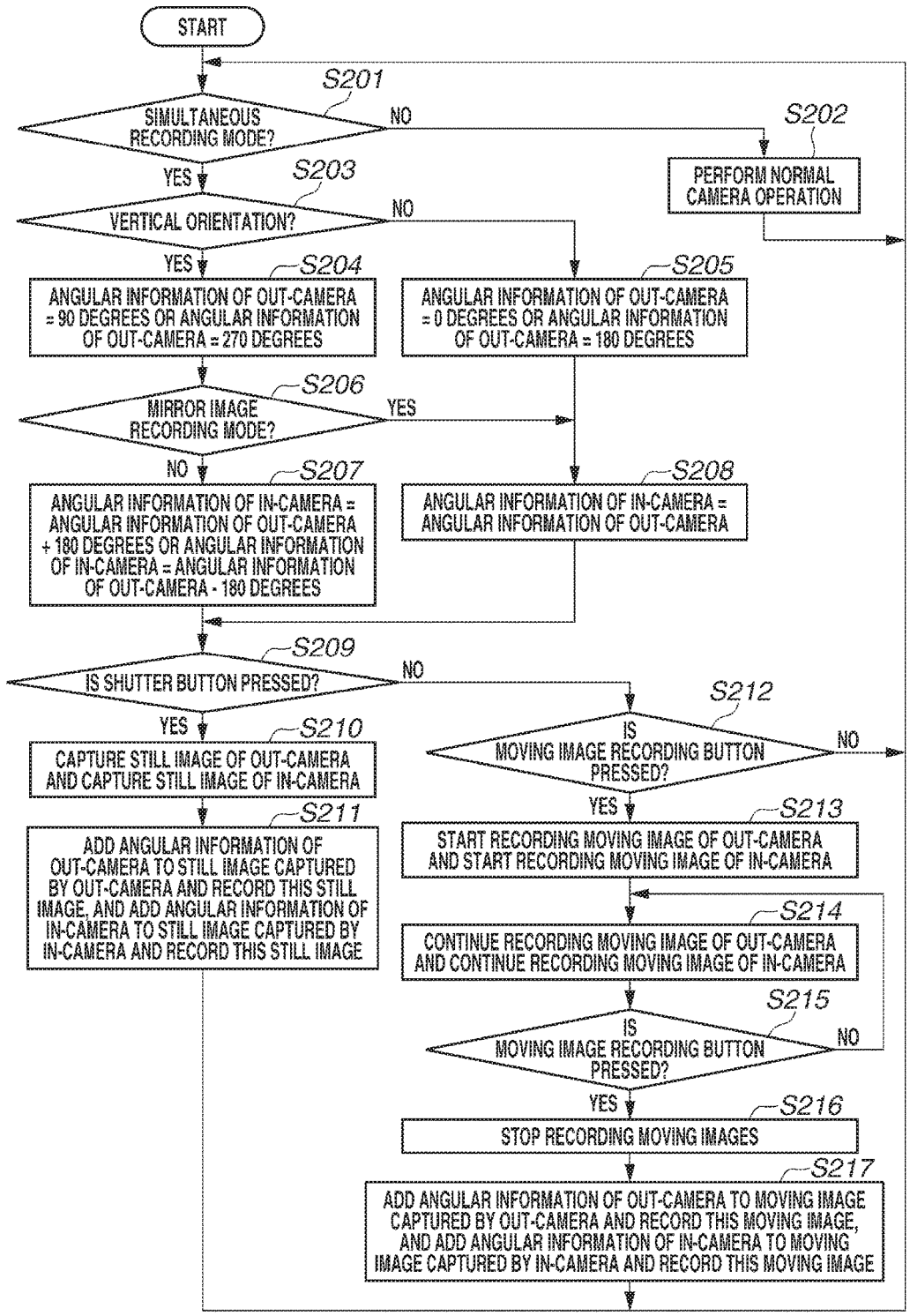

[Fig. 5A]
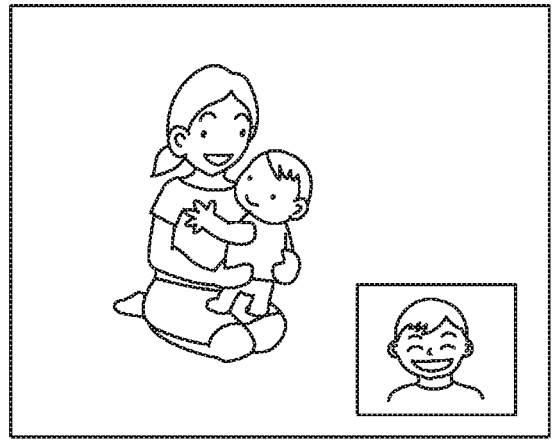
[Fig. 5B]
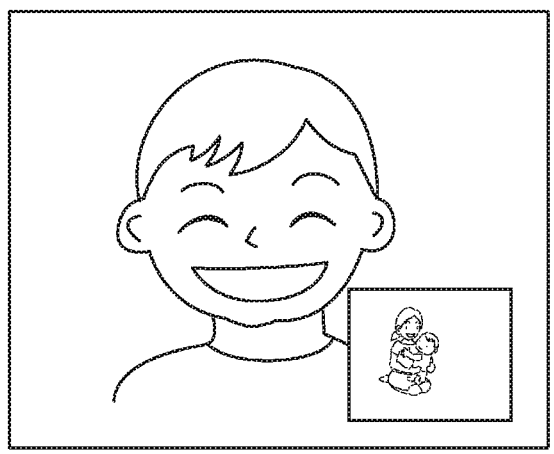
[Fig. 5C]
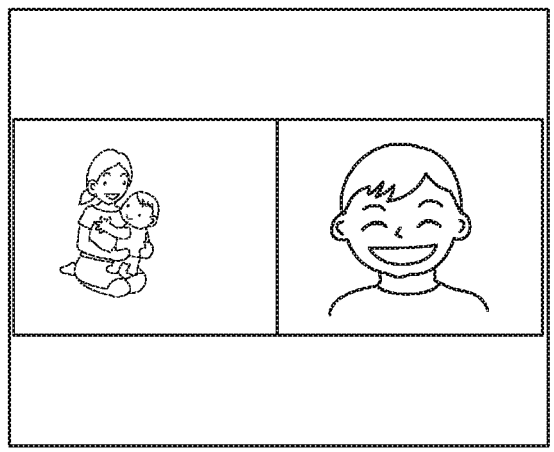

[Fig. 6A]
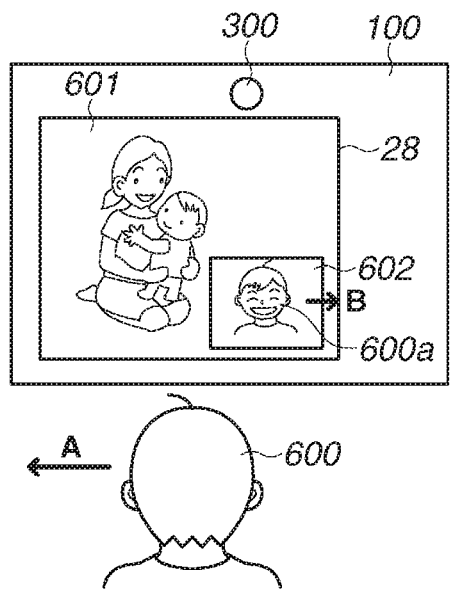
[Fig. 6B]
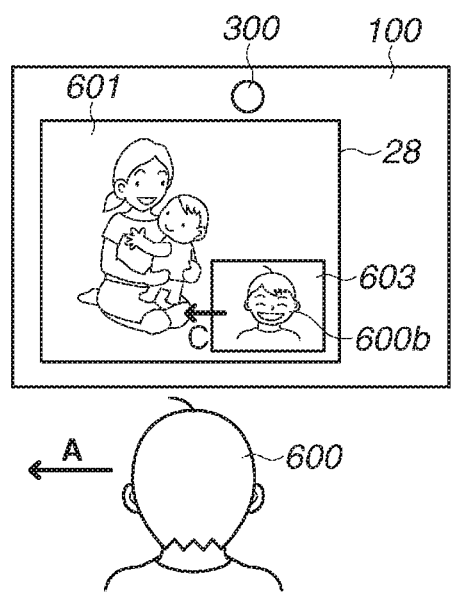

[Fig. 6C]
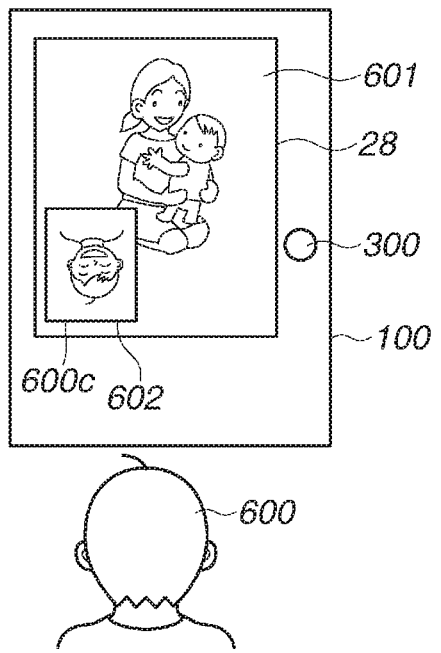
[Fig. 6D]
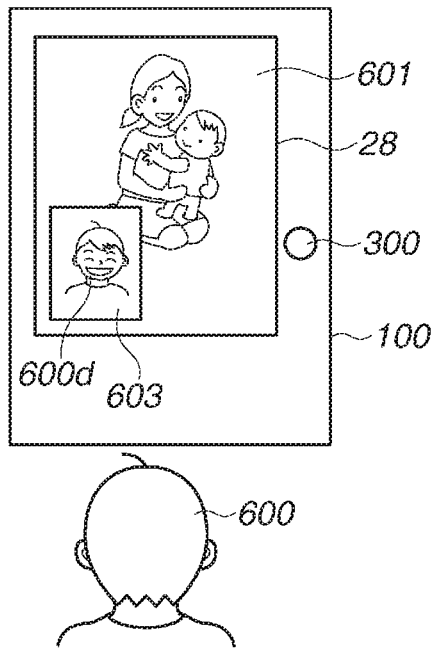

[Fig. 7]
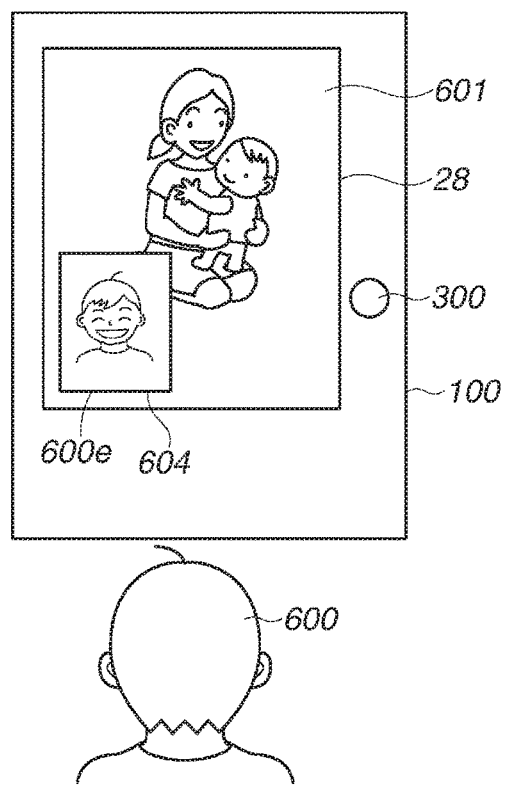

[Fig. 10]
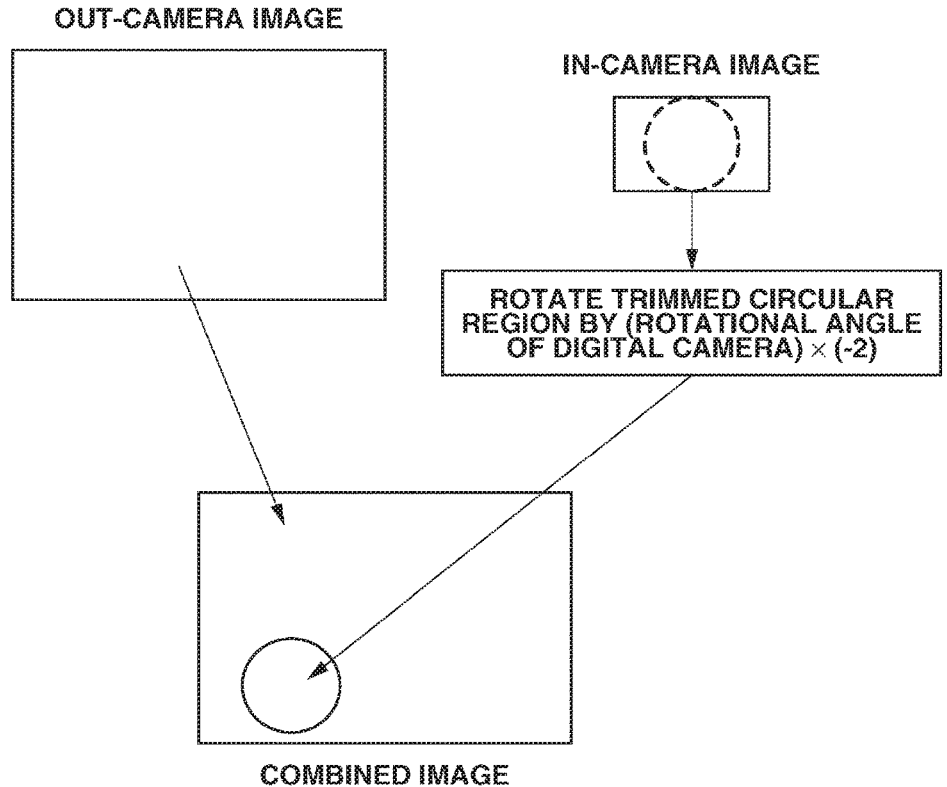
[Fig. 11]
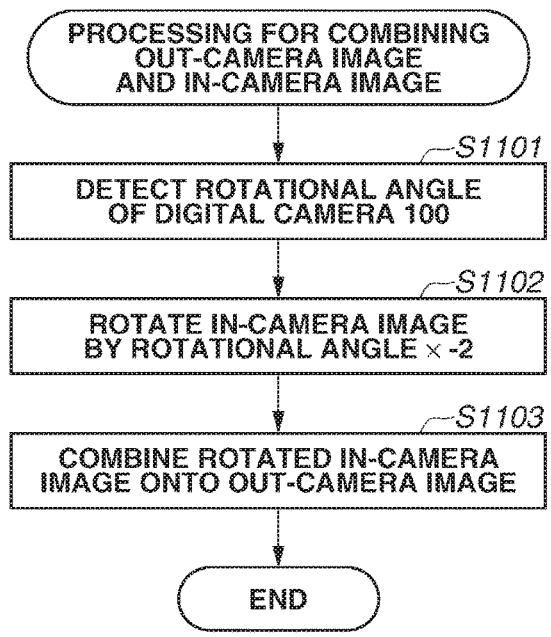

IMAGING APPARATUS, METHOD FOR CONTROLLING IMAGING APPARATUS, METHOD FOR CONTROLLING DISPLAY CONTROL APPARATUS, AND METHOD FOR CONTROLLING RECORDING APPARATUS

TECHNICAL FIELD

The present invention relates to an imaging apparatus configured to capture an image, a display control apparatus configured to control a display of a captured image, and a recording apparatus configured to record a captured image.

BACKGROUND ART

As one type of imaging apparatus, there is a camera that includes not only a normal camera (out-camera) configured to capture an image of an object but also another camera (in-camera) on a display unit side, and thereby can capture even a camera operator (photographer). PTL 1 discusses a mobile terminal that can acquire an image including a camera operator even in taking a group photograph or the like by capturing images with an out-camera and an in-camera at the same time, combining both images, and recording a combined image, with a single imaging operation.

Generally, when a live view image of the camera (in-camera) mounted on the display device side is displayed on a display device, the left side and the right side of the live view image are reversed like a mirror image by a mirror image reversal, so as to allow the camera operator himself/herself to easily frame the image.

CITATION LIST

Patent Literature

PTL 1: Japanese Patent Application No. 2010-83337

SUMMARY OF INVENTION

Technical Problem

Although the mirror image display facilitates framing during imaging, if a recorded image remains in the mirror image, this means that the recorded image is different from an actual image. Further, characters and the like are displayed with the left side and the right side thereof reversed by the mirror image reversal.

Solution to Problem

The present invention is directed to an apparatus that displays or records an image in a correct rotational state even when displaying or recording a normal image, which is not reversed by the mirror image reversal.

An imaging apparatus includes a first imaging unit, a second imaging unit configured to shoot an opposite direction from the first imaging unit, a detection unit configured to detect an orientation of the imaging apparatus, and a control unit configured to perform control for displaying an image captured by the first imaging unit and an image captured by the second imaging unit on a display unit at the same time. The control unit performs the control in such a manner that the image captured by the second imaging unit is displayed after being rotated if the orientation of the imaging apparatus is determined to be a predetermined orientation based on a result of detection by the detection unit, when the image captured by the second imaging unit is displayed together with the image captured by the first imaging unit without being reversed by a mirror image reversal.

An imaging apparatus includes an imaging unit capable of imaging a camera operator side, a detection unit configured to detect an orientation of the imaging apparatus, and a control unit configured to perform control in such a manner that an image captured by the imaging unit is displayed after being rotated by 180 degrees if the imaging apparatus is detected to have an orientation rotated by 90 degrees or 270 degrees.

An imaging apparatus includes a first imaging unit, a second imaging unit configured to shoot an opposite direction from the first imaging unit, a detection unit configured to detect an orientation of the imaging apparatus, and a control unit configured to perform control for recording an image captured by the first imaging unit and an image captured by the second imaging unit into a recording medium after adding rotational information according to the orientation of the imaging apparatus, which is detected by the detection unit, to these images. The control unit performs the control in such a manner that the image captured by the second imaging unit is recorded after rotational information out of phase with rotational information added to the image captured by the first imaging unit by 180 degrees is added to the image captured by the second imaging unit, if the orientation of the imaging apparatus is a vertical orientation.

An imaging apparatus includes a first imaging unit, a second imaging unit configured to shoot an opposite direction from the first imaging unit, a detection unit configured to detect a rotational angle of the imaging apparatus about a imaging direction of the first imaging unit, and a control unit configured to perform control for displaying an image captured by the first imaging unit and an image captured by the second imaging unit on a display unit at the same time. The control unit performs the control in such a manner that a rotated image generated by rotating the image captured by the second imaging unit by an angle minus two times as large as the rotational angle detected by the detection unit is displayed together with the image captured by the first imaging unit.

Further features of the present invention will become apparent from the following description of exemplary embodiments with reference to the attached drawings.

BRIEF DESCRIPTION OF DRAWINGS

FIG. 1 illustrates a back surface of a digital camera 100.

FIG. 2 illustrates a hardware configuration of the digital camera 100.

FIG. 3 is a flowchart illustrating processing by the digital camera 100 during imaging.

FIG. 4 is a flowchart illustrating recording processing by the digital camera 100 during imaging.

FIG. 5A illustrates a display example when an image captured by an out-camera and an image captured by an in-camera are displayed.

FIG. 5B illustrates a display example when the image captured by the out-camera and the image captured by the in-camera are displayed.

FIG. 5C illustrates a display example when the image captured by the out-camera and the image captured by the in-camera are displayed.

FIG. 6A is a diagram illustrating a display state in a normal image display and a mirror image display.

FIG. 6B is a diagram illustrating a display state in a normal image display and a mirror image display.

FIG. 6C is a diagram illustrating a display state in a normal image display and a mirror image display.

FIG. 6D is a diagram illustrating a display state in a normal image display and a mirror image display.

FIG. 7 illustrates a display example when the digital camera 100 is vertically oriented in a normal image display mode.

FIG. 10 illustrates an example when the in-camera image is circularly cutout and is displayed.

FIG. 11 is a flowchart illustrating processing for combining the out-camera image and the in-camera image according to the third exemplary embodiment.

DESCRIPTION OF EMBODIMENTS

Figure 8:
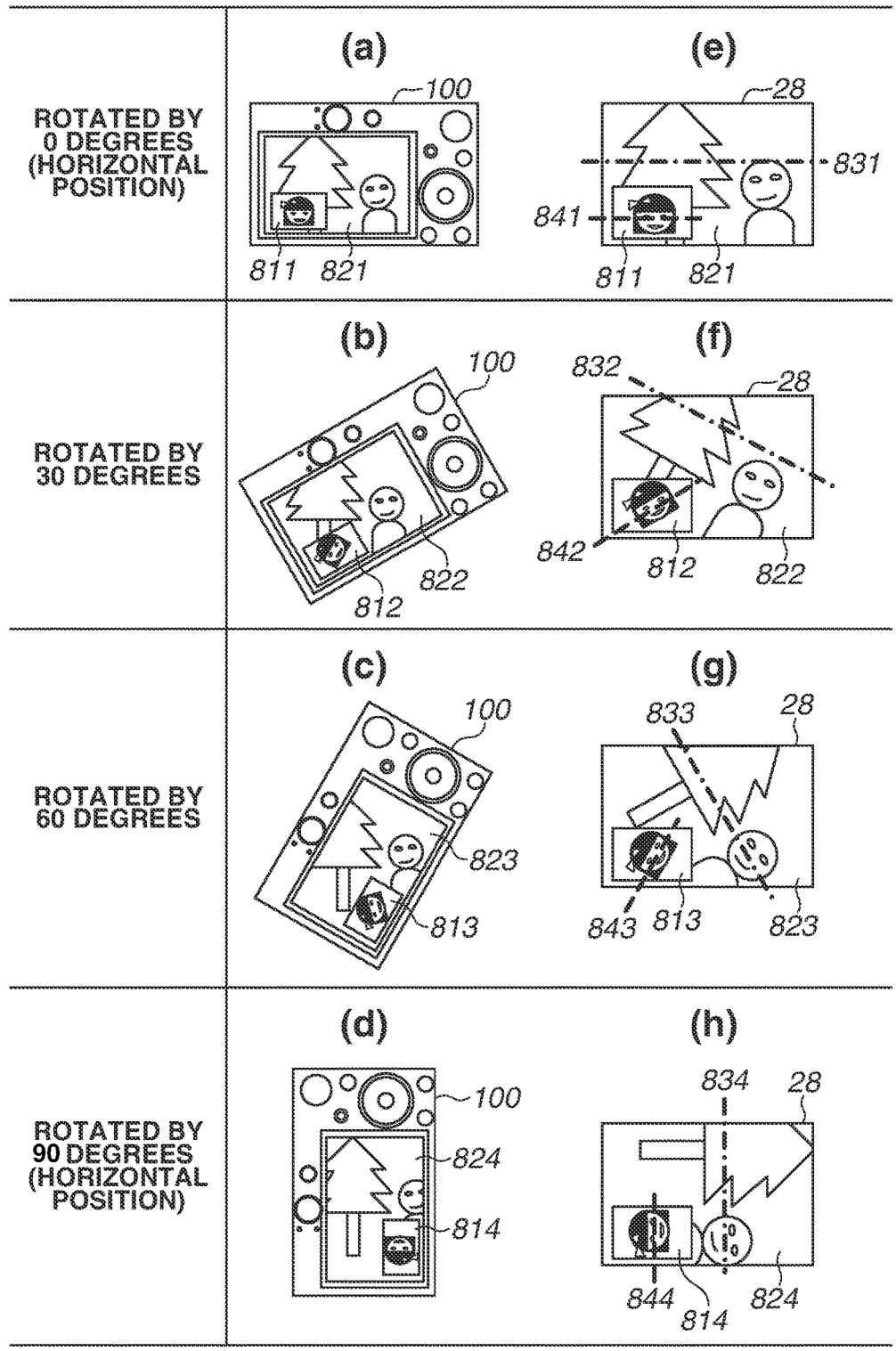
FIG. 8 illustrates states of digital camera 100 and a display unit 28 when an out-camera image and an in-camera image are displayed in the normal image display mode.

In the following description, exemplary embodiments of the present invention will be described with reference to the drawings.

Example 1

FIG. 1 illustrates an outer appearance of a digital camera 100 as one example of an imaging apparatus according to a first exemplary embodiment of the present invention.

A display unit 28 is a display unit that displays an image and various kinds of information. A shutter button 61 is an operation unit for issuing an imaging instruction. A mode dial 60 is an operation unit for switching various kinds of mode settings. A connector 112 is a connector between a connection cable and the digital camera 100. An operation unit 70 is an operation unit that includes operation members such as various kinds of switches, buttons, and a touch panel for receiving various kinds of operations from a user. A controller wheel 73 is an operation member capable of being rotationally operated, which is included in the operation unit 70. A power switch 72 switches power-on and power-off. An in-camera 300 is an imaging unit that images a camera operator imaging an object or a viewer viewing an image displayed on the display unit 28. The in-camera 300 is disposed so as to image a back side where the display unit 28 of the digital camera 100 is mounted, to image the viewer or the camera operator. Further, FIG. 1 illustrates an outer appearance of the back surface side of the digital camera 100 where the display unit 28 is mounted, but an out-camera, which is an imaging unit that images an object side, is mounted on a surface of the digital camera 100 on a front side. Optical axes (imaging directions) of the out-camera and the sub-camera are substantially in parallel with each other, and the optical axis (imaging direction) of the out-camera is set to a reverse direction of the optical axis (imaging direction) of the sub-camera. A recording medium 200 is a recording medium such as a memory card and a hard disk. A recording medium slot 201 is a slot for containing the recording medium 200. The recording medium 200 contained in the recording medium slot 201 can communicate with the digital camera 100, and images captured by the out-camera and the in-camera 300 are recorded into the recording medium 200. A cover 203 is a cover for the recording medium slot 201.

FIG. 2 illustrates a configuration of the digital camera 100 according to an exemplary embodiment of the present invention.

A barrier 10 covers the imaging unit including an imaging lens 11 of the digital camera 100, thereby preventing the imaging unit from being contaminated or broken. The digital camera 100 includes the imaging lens 11. A shutter 12 has a diaphragm function. An image sensor 13 includes a charge coupled device (CCD), a complementary metal-oxide semiconductor (CMOS) device, or the like that converts an optical image into an electric signal. An analog/digital (A/D) converter 15 converts an analog signal output from the image sensor 13 into a digital signal. These barrier 10, imaging lens 11, shutter 12, and image sensor 13 form the out-camera.

Similarly, an imaging lens 101 is a lens group that is prepared separately from the imaging lens 11 and includes a zoom lens and a focus lens mounted in a direction that allows the imaging lens 101 to image the camera operator side using the digital camera 100. A shutter 102 has the diaphragm function. An image sensor 103 includes a CCD device, a CMOS device, or the like that converts an optical image of the camera operator side into an electric signal. These imaging lens 101, shutter 102, and image sensor 103 form the in-camera 300.

A timing generation circuit 14 supplies a clock signal and a control signal to the image sensors 13 and 103, the A/D converter 15, and a digital/analog (D/A) converter 21, and is controlled by a memory control circuit 22 and a system control circuit 50.

An image processing circuit 20 performs predetermined pixel interpolation processing and color conversion processing on data from the A/D converter 15 or data from the memory control circuit 22.

Further, the image processing circuit 20 performs predetermined calculation processing with use of captured image data, and the system control circuit 50 controls an exposure control unit 40 and a ranging control unit 41 based on an acquired result of the calculation. Then, the exposure control unit 40 and the ranging control unit 41 performs automatic focus (AF) processing, automatic exposure (AE) processing, and flash pre-emission (EF) processing.

The image processing circuit 20 performs predetermined calculation processing with use of the captured image data, and automatic white balance (AWB) processing is also performed based on an acquired result of the calculation.

Further, the image processing circuit 20 reads an image stored in a memory 25, performs compressing processing or decompression processing according to the Joint Photographic Experts Group (JPEG) method or the Moving Picture Experts Group-4 Advanced Video Coding (MPEG-4 AVC)/H.264 method, and writes the processed data into the memory 25.

The memory control circuit 22 controls the A/D converter 15, the timing generation circuit 14, the image processing circuit 20, an image display memory 24, the D/A converter 21, and the memory 25.

The data of the A/D converter 15 is written into the image display memory 24 or the memory 25 via the image processing circuit 20 and the memory control circuit 22, or the data of the A/D converter 15 is directly written into the image display memory 24 or the memory 25 via the memory control circuit 22.

The digital camera 100 includes the image display memory 24 and the D/A converter 21. The display unit 28 includes a thin-film transistor liquid crystal display (TFT LCD) or the like. Image data for a display that is written in the image display memory 24 is displayed on the display unit 28 via the D/A converter 21.

An electronic finder function of displaying a live video image can be realized by successively displaying image data captured by the out-camera and/or the in-camera 300 with use of the display unit 28.

The memory 25 stores still images and moving images captured by the out-camera and the in-camera 300, and has a storage capacity sufficient for storing a predetermined number of still images and a moving image continuing for a predetermined time. Further, the memory 25 can also be used as a work area of the system control circuit 50.

The exposure control unit 40 individually controls the shutters 12 and 102, each of which has the diaphragm function.

The ranging control unit 41 individually controls focusing of the imaging lenses 11 and 101. A zoom control unit 42 individually controls zooming of the imaging lenses 11 and 101. A barrier control unit 43 controls an operation of the barrier 10.

An orientation detection sensor 44 periodically detects an orientation of the digital camera 100 with use of an acceleration sensor. When the orientation detection sensor 44 detects a rotational angle about the imaging direction of the out-camera, information indicating the detected angle is input into the system control circuit 50. The system control unit 50 determines the orientation (the rotational angle) of the digital camera 100 based on the input information, and controls the digital camera 100 in such a manner that the digital camera 100 performs processing according to the orientation. In the present exemplary embodiment, the imaging directions of the out-camera and the in-camera 300 are in parallel with each other and are reverse directions of each other, whereby the rotational angle about the imaging direction of the out-camera and a rotational angle about the imaging direction of the in-camera 300 should be equal to each other. In a case where the imaging directions of the in-camera 300 and the out-camera are not in parallel with each other, the digital camera 100 may be configured to also detect an orientation of the in-camera 300 (the rotational angle about the imaging direction of the in-camera 300).

The system control circuit (system control unit) 50 controls a whole of the digital camera 100.

A nonvolatile memory 51 is an electrically erasable and recordable memory. For example, an electrically erasable programmable read-only memory (EEPROM) is used as the nonvolatile memory 51. A program, various kinds of setting information, and the like are recorded in the nonvolatile memory 51.

Operation units 61-1, 61-2, and 62 are used to input various kinds of operation instructions for the system control circuit 50. The operation unit 62 includes a combination of one or more power switch(es), mode changeover switch(es), menu button(s), arrow key(s), touch panel(s), pointing unit(s) based on line-of-sight detection, speech recognition device(s), and/or the like.

The operation unit 61-1 is a shutter switch SW 1, and is switched on halfway through an operation of the not-illustrated shutter button 61 (not-illustrated) to instruct the digital camera 100 to start operations such as the AF (automatic focus) processing, the AE processing, the AWB processing, and the EF processing.

The operation unit 61-2 is a shutter switch SW2, and is switched on upon completion of the operation of the shutter button 61 (when the shutter button 61 is fully pressed). When the shutter switch SW2 is switched on, the digital camera 100 performs exposure processing for writing a signal read out from the image sensor 13 or the image sensor 103 into the memory 25 as image data via the A/D converter 15 and the memory control circuit 22. Then, the digital camera 100 performs development processing on the image data written in the memory 25 with use of calculations by the image processing circuit 20 and the memory control circuit 22, reads out the image data developed by the development processing from the memory 25, compresses the image data by the image processing circuit 20, and stores the compressed image data into the memory 25. Then, the digital camera 100 performs recording processing for writing the compressed image data stored in the memory 25 into an external recording medium 91 via a card controller 90. In this manner, the digital camera 100 performs the imaging processing including the exposure processing and the development processing, and the recording processing in response to switching on of the shutter switch SW2.

The operation unit 62 includes various kinds of buttons, a touch panel, and the like. More specifically, the operation unit 62 includes the power button, the menu button, the mode changeover switch for switching an imaging mode/a reproduction mode/another special imaging mode, the arrow key, a setting button, a macro button, a multiple-screen reproduction and page-advance button, a flash setting button, a single imaging/continuous imaging/self-timer changeover button, a menu scroll plus button, a menu scroll minus button, a reproduced image scroll plus button, a reproduced image scroll minus button, an capturing image quality selection button, an exposure correction button, a date and time setting button, and the like.

The digital camera 100 further includes a power source control unit 81.

A power source 80 includes a primary battery such as an alkaline battery and a lithium battery, a secondary battery such as a nickel cadmium (NiCd) battery, a nickel metal hydride (NiMH) battery, and a lithium (Li) battery, an alternating-current (AC) adapter, and the like.

The card controller 90 transmits and receives data to and from the external recording medium 91 such as a memory card.

The external recording medium 91 is embodied by, for example, a memory card.

Next, display modes when live view images captured by the out-camera and the in-camera 300 are displayed on the display unit 28, which is used to display a live view image, will be described.

Image data captured and acquired by the out-camera and the in-camera 300 is stored into the image display memory 24 and is displayed on the display unit 28 after being trimmed and/or resized according to a resolution of a display region on the display unit 28. When an image is captured with use of the in-camera 300 and the image captured by the in-camera 300 is recorded, the image captured by the in-camera 300 is displayed together with an image captured by the out-camera at the same time. Regarding how the images are displayed in a simultaneous display mode, in which an out-camera image and an in-camera image are displayed at the same time, the images are displayed in such a manner that a small-sized through-the-lens image of the in-camera 300 is superimposed and combined on a through-the-lens image of the out-camera as illustrated in FIG. 5A. How the images are displayed is not limited thereto, and the images may be displayed in such a manner that the small-sized through-the-lens image of the out-camera is superimposed on the through-the-lens image of the in-camera 300 as illustrated in FIG. 5B. Alternatively, the images may be displayed in such a manner that both the through-the-lens images are arranged side by side as illustrated in FIG. 5C.

FIG. 6A illustrates a live view image 601 of the out-camera, which is captured by the out-camera, and a live view image 602 captured by the in-camera 300. The imaging directions of the out-camera and the in-camera 300 are reverse directions of each other, and the in-camera 300 images the camera operator side where the display unit 28 is mounted, whereby the following situation occurs when the image of the in-camera 300 is displayed. In an example illustrated in FIG. 6A, the live view image 602 captured by the in-camera 300 is displayed without being processed by processing such as a mirror image reversal or a rotation, whereby a camera operator 600 ends up viewing the live view image 602 of the in-camera 300 in a reverse direction of the imaging direction of the in-camera 300. Therefore, when the camera operator 600 moves in a direction A, a camera operator 600a in the live view image 602 of the in-camera 300 moves in a direction B, which is a reverse direction of the direction A. Such a display method is considered to cause user's confusion. Therefore, the digital camera 100 according to the present exemplary embodiment has a mirror image display mode of displaying an image captured by the in-camera 300 after performing the mirror image reversal on this image, so that the image captured by the in-camera 300 appears as a mirror image when being displayed on the display unit 28.

FIG. 6B illustrates a display example in the mirror image display mode. In the mirror image display mode, the digital camera 100 displays a mirror image live view image 603 of the in-camera 300, which is generated by reversing the image captured by the in-camera 300 in a horizontal direction of the main body of the digital camera 100 (the mirror image reversal). Since the image is displayed after being horizontally reversed, when the camera operator 600 moves in the direction A, a camera operator 600b in the mirror image live view image 603 of the in-camera 300 moves in a direction C, which is the same direction as the direction A. The mirror image live view image 603 of the in-camera 300 appears in a similar manner to an image when the camera operator 600 looks in a mirror, and a movement direction of the camera operator 600b in the mirror image live view image 603 of the in-camera 300 can match a movement direction of the camera operator 600, whereby the camera operator 600 can view the image of the in-camera 300 without being confused.

The digital camera 100 has not only the mirror image display mode but also a normal image display mode of displaying an image captured by the in-camera 300 without performing the mirror image reversal on this image as illustrated in FIG. 6A. In the mirror image display mode, a movement direction of a camera operator in a live view image can match an actual movement direction of the camera operator, but the live view image is a reverse of an actually captured image and thus may cause an uncomfortable feeling. Therefore, there is also such a request that users want to display an accurate live view image that is not reversed. Accordingly, the digital camera 100 has two display modes, the normal image display mode and the mirror image display mode, and is configured to be able to switch the display mode between them in response to a user's operation performed for switching the display mode with use of an operation unit for setting the display mode.

In this manner, comparing the normal image display mode and the mirror image display mode, the live view image 602 and the live view image 603 are displayed so as to have same directions on short sides but have reverse directions on long sides.

FIG. 6D illustrates a display when the digital camera 100 is rotated by 90 degrees about the optical axis in the mirror image display mode. In the mirror image display mode, the live view image 603 of the in-camera 300 is displayed as a mirror image. Therefore, even when the digital camera 100a is rotated, a vertical direction of a camera operator (an object) 600d in the live view image 603 of the in-camera 300 matches an actual vertical direction of the camera operator 600.

FIG. 6C illustrates an example when the digital camera 100 is rotated by 90 degrees about the optical axis in a normal image display state. In this case, a vertical direction of a camera operator 600c in the live view image 602 of the in-camera 300 when the digital camera 100 is rotated by 90 degrees about the optical axis is the same direction as a horizontal direction when the digital camera 100 is not rotated about the optical axis with respect to the display unit 28. Therefore, the vertical direction of the camera operator 600c in the live view image 602 of the in-camera 300 when the digital camera 100 is rotated by 90 degrees about the optical axis in the normal image display state is displayed as a reverse direction of the actual vertical direction of the camera operator 600. Thus, rotating the digital camera 100 about the optical axis in the normal image display state results in a display of a vertically reversed live view image of the in-camera 300. The fact that the live view image 602 in the case of the normal image display has a reverse direction on the long side with respect to the live view image 603 in the case of the mirror image display also makes it understandable that rotating the digital camera 100 by 90 degrees about the optical axis in the normal image display state results in a reversal of the vertical direction. Therefore, the digital camera 100 according to the present exemplary embodiment displays a live view image 604 of the in-camera 300, which is rotated by 180 degrees, as illustrated in FIG. 7, when the digital camera 100 is rotated by 90 degrees about the optical axis in the normal image display mode. This configuration allows a vertical direction of a camera operator (the object) 600e in the live view image 604 to match the actual vertical direction of the camera operator (the object) 600. The live view image 604 of the in-camera 300 illustrated in FIG. 7 is displayed as a normal image, which corresponds to an actual original state, since the image captured by the in-camera 300 is rotated but is not reversed.

Next, processing performed by the digital camera 100 according to the present exemplary embodiment during imaging will be described with reference to FIG. 3. By this processing, the digital camera 100 displays through-the-lens images (live video images) of the out-camera and the in-camera 300 at the same time, and generates a still image or a moving image by combining the through-the-lens images of the out-camera and the in-camera 300 according to the same layout as the display in response to a single imaging instruction. FIG. 3 is a flowchart illustrating a display process, a imaging process, and a recording process performed by the digital camera 100 during imaging. The system control unit 50, for example, controls the respective units, makes a calculation, and makes a determination based on the program read out from the nonvolatile memory 51, by which these processes are realized.

In step S101, the digital camera 100 determines whether the digital camera 100 is set to the simultaneous display mode of displaying images captured with use of both the out-camera and the in-camera 300 on the display unit 28 at the same time. If the digital camera 100 is set to the simultaneous display mode (YES in step S101), the digital camera 100 combines an image captured by the out-camera and an image captured by the in-camera 300 to display them on the display unit 28 at the same time. Further, the digital camera 100 combines the image captured by the out-camera and the image captured by the in-camera 300 according to the same layout as a layout displayed on the display unit 28 to record a combined image into the external recording medium 91. The digital camera 100 may determine whether the digital camera 100 is set to a simultaneous recording mode of combining and recording images of both the out-camera and the in-camera 300, instead of determining whether the digital camera 100 is set to the simultaneous display mode. In the simultaneous recording mode, the digital camera 100 performs similar processing to the processing in the simultaneous display mode. Assume that these modes can be switched by a user's operation for setting the recording mode. If the digital camera 100 determines that the digital camera 100 is not set to the simultaneous display mode in step S101 (NO in step S101), the processing proceeds to step S114, in which the digital camera 100 only performs a normal camera operation. In step S114, in the normal camera operation, the digital camera 100 displays only the image captured by the out-camera on the display unit 28, and records the image captured by the out-camera into the external recording medium 91 in response to pressing of the shutter button 61 (the switch SW2 is switched on) and an input of an imaging instruction. If the digital camera 100 determines that the digital camera 100 is set to the simultaneous display mode in step S101 (YES in step S101), the processing proceeds to step S102. In step S102, the digital camera 100 determines whether the display mode is the normal image display mode or the mirror image display mode. If the digital camera 100 determines that the display mode is not the mirror image display mode but is the normal image display mode (NO in step S102), the processing proceeds to step S103, in which the digital camera 100 determines whether the orientation of the digital camera 100 is a vertical orientation. More specifically, the digital camera 100 acquires rotational angle information, which is a result of detection by the orientation detection sensor 44, and determines the orientation of the digital camera 100 based on the rotational angle information. The vertical orientation is an orientation when the rotational angle about the imaging direction (about the optical axis) is 90 degrees or 270 degrees. Therefore, in the present exemplary embodiment, if the acquired rotational angle information indicates an angle from 50 to 130 degrees or from 230 to 310 degrees, the digital camera 100 determines that the orientation of the digital camera 100 is the vertical orientation. Then, if the acquired rotational angle information indicates an angle outside the ranges of 50 to 130 degrees and 230 to 310 degrees (an angle from 0 to 50 degrees, 130 to 230 degrees, or 310 to 360 degrees), the digital camera 100 determines that the orientation of the digital camera 100 is a horizontal orientation. If the digital camera 100 determines that the orientation of the digital camera 100 is not the vertical direction in step S103 (NO in step S103), in step S104, the digital camera 100 displays the through-the-lens image of the out-camera and the through-the-lens image of the in-camera 300 on the display unit 28 without performing the rotation process and the mirror image reversal process. If the digital camera 100 determines that the digital camera 100 is located at a vertical position in step S103 (YES in step S103), the processing proceeds to step S105. In step S105, the digital camera 100 performs the rotation process for a rotation by 180 degrees on the through-the-lens image of the in-camera 300, and displays the rotated through-the-lens image of the in-camera 300 together with the through-the-lens image of the out-camera on the display unit 28.

If the digital camera 100 determines that the display mode is the mirror image display mode in step S102 (YES in step S102), the processing proceeds to step S106, in which the digital camera 100 performs the mirror image reversal process for a horizontal reversal on the image data acquired by being captured by the in-camera 300, and displays the reversed image on the display unit 28. In the mirror image display mode, even when the digital camera 100 is rotated about the optical axis, a vertical direction of an object in the image captured by the in-camera 300 is not displayed as a reverse direction of an actual vertical direction. Therefore, even when the digital camera 100 is vertically oriented, the digital camera 100 does not rotate the live view image of the in-camera 300 by 180 degrees. When the digital camera 100 displays the live view image of the out-camera and the live view image of the in-camera 300 in step S104, S105, or S106, the digital camera 100 displays them after combining the image data acquired by being captured by the in-camera 300 on the image data acquired by being captured by the out-camera while arranging the image data of the in-camera 300 into a smaller size than the image of the out-camera, as illustrated in FIG. 5A. At this time, the image data acquired from the out-camera is displayed without being processed by the mirror image reversal process and the rotation process.

Subsequently, in step S107, the digital camera 100 determines whether the shutter button 61 is pressed. If the digital camera 100 determines that the shutter button 61 is pressed in step S107 (YES in step S107), the processing proceeds to step S108. In step S108, the digital camera 100 captures still images by the out-camera and the in-camera 300, combines the still image of the out-camera and the still image of the in-camera 300 according to the same layout as a state in which the through-the-lens images are displayed, and records a combined image into the external recording medium 91 as a still image file. Then, the processing returns to step S101, from which the present processing is repeated. The present processing is repeatedly performed until the digital camera 100 is powered off or an operation mode of the digital camera 100 is changed from the imaging mode to another mode. If the digital camera 100 determines that the shutter button 61 is not pressed in step S107 (NO in step S107), the processing proceeds to step S109, in which the digital camera 100 determines whether a moving image recording button 71 is pressed. If the digital camera 100 determines that the moving image recording button 71 is not pressed in step S109 (NO in step S109), the processing returns to step S101, from which the present processing is repeated. If the digital camera 100 determines that the moving image recording button 71 is pressed in step S109 (YES in step S109), the processing proceeds to step S110, in which the digital camera 100 starts recording moving images. After the digital camera 100 starts recording the moving images, in step S111, the digital camera 100 performs the processes of imaging and recording the moving images. In the imaging and recording of the moving images, the digital camera 100 combines a moving image captured by the out-camera and a moving image captured by the in-camera 300 according to the displayed layout, and records a combined moving image acquired from the combination into the external recording medium 91. In step S112, the digital camera 100 determines whether the moving image button is pressed again while continuing imaging and recording the moving images. Until the moving image button is pressed again in step S112, the processing returns to step S111, in which the digital camera 100 continues recording the moving images. If the digital camera 100 determines that the moving image button is pressed in step S112 (YES in step S112), in step S113, the digital camera 100 stops recording the moving images, and records the combined moving image having been recorded until this time as a single moving image file. Then, the processing returns to step S101, from which the processing is repeated.

When the digital camera 100 captures and records the still images or the moving images in step S108 or step S111, the digital camera 100 combines the image captured by the out-camera and the image captured by the in-camera 300 according to the same layout as the display on the display unit 28. This means that, in step S108 or S111, the digital camera 100 also makes similar determinations to steps S102 and S103, and combines the image captured by the in-camera 300 with the image captured by the out-camera while performing the reversal process or the rotation process on the image captured by the in-camera 300 according to results of the determinations in a similar manner to step S104, S105, or S106. The determination of whether to reverse or rotate the image captured by the in-camera 300 when recording the image (step S108 or S111) is similar to the determination when displaying the images (steps S102 to S106), and therefore a description thereof is omitted here.

By performing above processing, the digital camera 100 can display and record the image of the in-camera 300 in a correct vertical state regardless of the orientation of the digital camera 100 (the vertical orientation or the horizontal orientation) and the normal/mirror image display mode of the in-camera image, when displaying and recording the image of the out-camera and the image of the in-camera 300 after combining them.

The above-described exemplary embodiment has been described assuming that, when the display mode of the in-camera 300 is the mirror image display mode, the digital camera 100 records a still image or a moving image while keeping the sill image or the moving image to be recorded as a mirror image. However, the digital camera 100 may be configured to use a mirror image only when displaying the through-the-lens image of the in-camera 300 but use a normal image when recording the through-the-lens image of the in-camera 300. In this case, in steps S108 and SI 11, even when the display mode is the mirror image display mode, the digital camera 100 combines the image captured by the in-camera 300 with the image captured by the out-camera without performing the mirror image reversal on the image captured by the in-camera 300 to record the combined image. Further, if the orientation of the digital camera 100 is determined to be the vertical orientation, recording the image captured by the in-camera 300 as a normal image can be realized by combining the image captured by the in-camera 300 with the image captured by the out-camera while rotating the image captured by the in-camera 300 by 180 degrees and then recording the combined image, even when the display mode is the mirror image display mode.

Further, the above-described exemplary embodiment has been described based on the example in which the digital camera 100 combines the image captured by the out-camera and the image captured by the in-camera 300, and displays the combined image. However, the above-described exemplary embodiment can also be applied to an example in which the digital camera 100 displays only the image captured by the in-camera 300. In this case, when the display mode of the image of the in-camera 300 is the mirror image display mode, the digital camera 100 displays the image captured by the in-camera 300 on the display unit 28 after horizontally reversing (performing the mirror image reversal on) the image. Then, when the display mode of the image of the in-camera 300 is the normal image display mode, the digital camera 100 determines the orientation of the digital camera 100. If the digital camera 100 determines that the orientation of the digital camera 100 is the horizontal orientation, the digital camera 100 displays the image captured by the in-camera 300 on the display unit 28 without rotating or reversing the image. On the other hand, if the digital camera 100 determines that the orientation of the digital camera 100 is the vertical orientation, the digital camera 100 displays the image captured by the in-camera 300 on the display unit 28 after rotating the image by 180 degrees without revering the image.

Example 2

Next, a second exemplary embodiment of a digital camera 100 will be described with reference to FIG. 4. According to the present exemplary embodiment, the digital camera 100 is configured similarly to the first exemplary embodiment, and captures and records video images of the out-camera and the in-camera 300 at the same time in response to a single imaging instruction. However, according to the second exemplary embodiment, the digital camera 100 does not combine the images captured by the out-camera and the in-camera 300 into a single still image file or a single moving image file, but records the respective images captured by the out-camera and the in-camera 300 as different still image files or different moving image files. At this time, the digital camera 100 adds angular information to the respective still image files or the respective moving image files.

FIG. 4 is a flowchart illustrating imaging and recording processes performed by the digital camera 100 according to the present exemplary embodiment during imaging. Similarly, the system control unit 50, for example, controls the respective units, makes a calculation, and makes a determination based on the program read out from the nonvolatile memory 51, by which these processes are also realized. Further, a description of a display process during imaging will be omitted, but this display process can be realized by performing a similar display process to the first exemplary embodiment.

First, in step S201, the digital camera 100 determines whether the digital camera 100 is set to the simultaneous recording mode of imaging and recording images with use of both the out-camera and the in-camera 300 in response to an imaging instruction. If the digital camera 100 determines that the digital camera 100 is not set to the simultaneous recording mode in step S201 (NO in step S201), the processing proceeds to step S202, in which the digital camera 100 performs the normal camera operation in a similar manner to step S114. After the digital camera 100 performs the normal camera operation, the processing returns to the process of step S201. If the digital camera 100 determines that the digital camera 100 is set to the simultaneous recording mode in step S201 (YES in step S201), the processing proceeds to step S203, in which the digital camera 100 determines whether the orientation of the digital camera 100 is the vertical orientation in a similar manner to step S103. If the digital camera 100 determines that the orientation of the digital camera 100 is not the vertical orientation but is the horizontal orientation in step S203 (NO in step S203), in step S205, the digital camera 100 records and holds 0 degrees or 180 degrees as angular information of the out-camera into the memory 25. If the digital camera 100 determines that the orientation of the digital camera 100 is the vertical orientation in step S203 (YES in step S203), in step S204, the digital camera 100 records and holds 90 degrees or 270 degrees as the angular information of the out-camera into the memory 25. More specifically, if the rotational angle of the digital camera 100, which is acquired from the orientation detection sensor 44, is an angle from 0 to 50 degrees or 310 to 360 degrees (from −50 to 50 degrees), the angular information of the out-camera is set to 0 degrees. If the rotational angle is an angle from 130 to 230 degrees, the angular information of the out-camera is set to 180 degrees. Then, if the rotational angle is an angle from 50 to 130 degrees, the angular information of the out-camera is set to 90 degrees. If the rotational angle is an angle from 230 to 310 degrees, the angular information of the out-camera is set to 270 degrees.

If the digital camera 100 determines that the orientation of the digital camera 100 is the horizontal orientation in step S203 (NO in step S203), in step S205, the digital camera 100 holds the angular information of the out-camera. Then, in step S208, the digital camera 100 also holds the same angular information as the angular information of the out-camera into the memory 25 as angular information of the in-camera 300. If the digital camera 100 determines that the orientation of the digital camera 100 is the vertical orientation in step S203 (YES in step S203), in step S206, the digital camera 100 determines whether the digital camera 100 is set to a normal image recording mode of recording the image captured by the in-camera 300 as a normal image without reversing it, or a mirror image recoding mode of recording the image captured by the in-camera 300 as a horizontally reversed mirror image (a mirror image reversed by the mirror image reversal). At this time, the digital camera 100 may determine whether the digital camera 100 is set to the normal image display mode or the mirror image display mode, instead of determining the recording mode. The digital camera 100 records a normal image when the digital camera 100 is set to the normal image display mode, and the digital camera 100 records a mirror image when the digital camera 100 is set to the mirror image display mode. If the digital camera 100 determines that the digital camera 100 is set to the mirror image recording mode in step S206 (YES in step S206), the processing proceeds to step S208, in which the digital camera 100 holds the same angular information as the angular information of the out-camera as the angular information of the in-camera 300. If the digital camera 100 determines that the digital camera 100 is not set to the mirror image recording mode but is set to the normal image recording mode in step S206 (NO in step S206), the digital camera 100 holds angular information out of phase with the angular information of the out-camera by 180 degrees as the angular information of the in-camera 300. In other words, the angular information of the in-camera 300 is determined as the angular information of the in-camera 300=the angular information of the out-camera+180 degrees, or the angular information of the in-camera 300=the angular information of the out-camera minus 180 degrees. Therefore, if the angular information of the out-camera is 90 degrees, the angular information of the in-camera 300 is determined to be 270 degrees. If the angular information of the out-camera is 270 degrees, the angular information of the in-camera 300 is determined to be 90 degrees. In this manner, the digital camera 100 determines the angular information of each of the out-camera and the in-camera 300 according to the orientation of the digital camera 100 and the normal/mirror image recording mode by the processes of steps S203 to S208. The process for determining the angular information of the out-camera and the angular information of the in-camera 300 is repeated until the shutter button 61 is pressed in step S209 or until the moving image recording button 71 is pressed in step S212, and the latest angular information is kept being updated into the memory 25.

In step S209, the digital camera 100 determines whether the shutter button 61 is pressed. If the digital camera 100 determines that the shutter button 61 is pressed in step S209 (YES in step S209), in step S210, the digital camera 100 captures respective still images by the out-camera and the in-camera 300. Then, the processing proceeds to step S211, in which the digital camera 100 reads out the angular information of the out-camera and the angular information of the in-camera 300 held in the memory 25. Then, the digital camera 100 adds the angular information of the out-camera to the still image captured by the out-camera, and records this image as a single still image file. Further, the digital camera 100 adds the angular information of the in-camera 300 to the still image captured by the in-camera 300, and records this image as a single still image file. Then, the processing returns to step S201, from which the processing is repeated. If the digital camera 100 determines that the shutter button 61 is not pressed in step S209 (NO in step S209), the processing proceeds to step S212, in which the digital camera 100 determines whether the moving image recording button 71 is pressed. If the digital camera 100 determines that the moving image recording button 71 is not pressed in step S212 (NO in step S212), the processing returns to step S201, from which the processing is repeated. If the digital camera 100 determines that the moving image recording button 71 is pressed in step S212 (YES in step S212), the processing proceeds to step S213, in which the digital camera 100 starts recording respective moving images by the out-camera and the in-camera 300. In step S214, the digital camera 100 continues recording the respective moving images by the out-camera and the in-camera 300. Then, in step S215, the digital camera 100 determines whether the moving image recording button 71 is pressed again. If the digital camera 100 determines that the moving image recording button 71 is not pressed in step S215 (NO in step S215), the processing returns to step S214, in which the digital camera 100 continues recording the moving images. If the digital camera 100 determines that the moving image recording button 71 is pressed in step S215 (YES in step S215), in step S216, the digital camera 100 stops recording the moving images. Then, the processing proceeds to step S217, in which the digital camera 100 reads out the angular information of the out-camera and the angular information of the in-camera 300 held in the memory 25. Then, the digital camera 100 adds the angular information of the out-camera to the moving image captured by the out-camera, and records this moving image as a single moving image file. Further, the digital camera 100 adds the angular information of the in-camera 300 to the moving image captured by the in-camera 300, and records this moving image as a single moving image file. After that, the processing returns to step S201, from which the processing is repeated.

By performing this recording processing, the digital camera 100 can record the images with the correct angular information added thereto regardless of the orientation of the digital camera 100 (the vertical orientation or the horizontal orientation) and the normal/mirror image recording mode of the in-camera image, when recording the images captured by the out-camera and the in-camera 300.

Example 3

Next, a third exemplary embodiment of a digital camera 100 will be described with reference to FIGS. 8 and 9. According to the present exemplary embodiment, the digital camera 100 is configured similarly to the first exemplary embodiment and the second exemplary embodiment, and captures and records video images of the out-camera and the in-camera 300 at the same time. However, according to the third exemplary embodiment, the digital camera 100 displays the image of the in-camera 300 after combining the image of the in-camera 300 with the image of the out-camera while rotating the image of the in-camera 300 by an angle minus two times as large as the rotational angle of the digital camera 100, when displaying the image of the in-camera 300 as a normal image without performing the mirror image reversal thereon.

FIG. 8 illustrates states (a) to (d) of the digital camera 100 and display screens (e) to (h) of the display unit 28 when the present exemplary embodiment is not carried out in the display mode of displaying an image of the in-camera 300 as a normal image without displaying this image after performing the mirror image reversal thereon.

The state (a) illustrated in FIG. 8 indicates a state of the digital camera 100 located at a horizontal position where the digital camera 100 is not rotated about the imaging direction of the out-camera, and the display screen (e) illustrated in FIG. 8 indicates a display screen displayed on the display unit 28 when the digital camera 100 is in the state (a) illustrated in FIG. 8.

The state (b) illustrated in FIG. 8 indicates a state of the digital camera 100 when the digital camera 100 is rotated about the optical axis (the imaging direction of the out-camera) by 30 degrees in the counterclockwise direction, and the display screen (f) illustrated in FIG. 8 indicates a display screen displayed on the display unit 28 when the digital camera 100 is in the state (b) illustrated in FIG. 8.

The state (c) illustrated in FIG. 8 indicates a state of the digital camera 100 when the digital camera 100 is rotated about the optical axis (the imaging direction of the out-camera) by 60 degrees in the counterclockwise direction, and the display screen (g) illustrated in FIG. 8 indicates a display screen displayed on the display unit 28 when the digital camera 100 is in the state (c) illustrated in FIG. 8.

The state (d) illustrated in FIG. 8 indicates a state of the digital camera 100 when the digital camera 100 is rotated about the optical axis (the imaging direction of the out-camera) by 90 degrees, and the display screen (h) illustrated in FIG. 8 indicates a display screen displayed on the display unit 28 when the digital camera 100 is in the state (d) illustrated in FIG. 8.

FIG. 8 illustrates images 811, 812, 813, and 814 respectively captured by the in-camera 300, and images 821, 822, 823, and 844 respectively captured by the out-camera. Lines 831, 832, 833, and 834 indicate horizontal directions in the images 821, 822, 823, and 844 of the out-camera, respectively. Lines 841, 842, 843, and 844 indicate horizontal directions in the images 811, 812, 813, and 814 of the in-camera 300, respectively. These lines indicating the horizontal directions are not displayed on the display unit 28. Assume that, among the states and the display screens (a) to (h) illustrated in FIG. 8, no change occurs in a position of an object of the in-camera 300 and a position of an object of the out-camera, and the rotation of the digital camera 100 about the optical axis (the imaging direction of the out-camera) causes the changes in the images displayed on the display unit 28.

On the display screens (e) to (h) illustrated in FIG. 8, the horizontal directions 831, 832, 833, and 834 of the out-camera images 821, 822, 823, and 824, and the horizontal directions 841, 842, 843, and 844 of the in-camera images 811, 812, 813, and 814 are horizontally symmetric on the display unit 28. This is because the imaging direction of the out-camera and the imaging direction of the in-camera 300 are reverse directions of each other. Therefore, the horizontal direction of the out-camera image and the horizontal direction of the in-camera image are rotated in reverse directions of each other when the digital camera 100 is rotated.

When the digital camera 100 is rotated by 30 degrees in the counterclockwise direction as indicated by the state (b) illustrated in FIG. 8, the horizontal direction 832 of the out-camera image 822 is rotated by −30 degrees in the counterclockwise direction as indicated by the display screen (f) illustrated in FIG. 8. On the other hand, when the digital camera 100 is rotated by 30 degrees in the counterclockwise direction, the horizontal direction 842 of the in-camera image 812 is rotated by 30 degrees in the counterclockwise direction as indicated by the display screen (f) illustrated in FIG. 8.

Further, when the digital camera 100 is rotated by 60 degrees in the counterclockwise direction as indicated by the state (c) illustrated in FIG. 8, the horizontal direction 833 of the out-camera image 823 is rotated by −60 degrees in the counterclockwise direction as indicated by the display screen (g) illustrated in FIG. 8. On the other hand, when the digital camera 100 is rotated by 60 degrees in the counterclockwise direction, the horizontal direction 843 of the in-camera image 813 is rotated by 60 degrees in the counterclockwise direction as indicated by the display screen (g) illustrated in FIG. 8.

Further, when the digital camera 100 is rotated by 90 degrees in the counterclockwise direction as indicated by the state (d) illustrated in FIG. 8, the horizontal direction 834 of the out-camera image 824 is rotated by −90 degrees in the counterclockwise direction as indicated by the display screen (h) illustrated in FIG. 8. On the other hand, when the digital camera 100 is rotated by 90 degrees in the counterclockwise direction, the horizontal direction 844 of the in-camera image 814 is rotated by 90 degrees in the counterclockwise direction as indicated by the display screen (h) illustrated in FIG. 8.

In this manner, when the digital camera 100 is set to the display mode of displaying the in-camera image as a normal image, the horizontal direction of the in-camera image and the horizontal direction of the out-camera image have a difference twice as large as the rotational angle of the digital camera 100 therebetween, because the horizontal direction of the in-camera image and the horizontal direction of the out-camera image are rotated in different directions from each other.

Therefore, according to the present exemplary embodiment, in the display mode of displaying the in-camera image as a normal image, the digital camera 100 displays the in-camera image and the out-camera image in such a manner that the horizontal direction of the in-camera image matches the horizontal direction of the out-camera image, by displaying them after rotating the in-camera image by an angle minus two times as large as the rotational angle of the digital camera 100.

The present exemplary embodiment will be described with reference to FIG. 9. FIG. 9 illustrates states of the digital camera 100 and display screens of the display unit 28 when the present exemplary embodiment is carried out in the display mode of displaying the in-camera image together with the out-camera image while displaying the in-camera image as a normal image.

Figure 9:
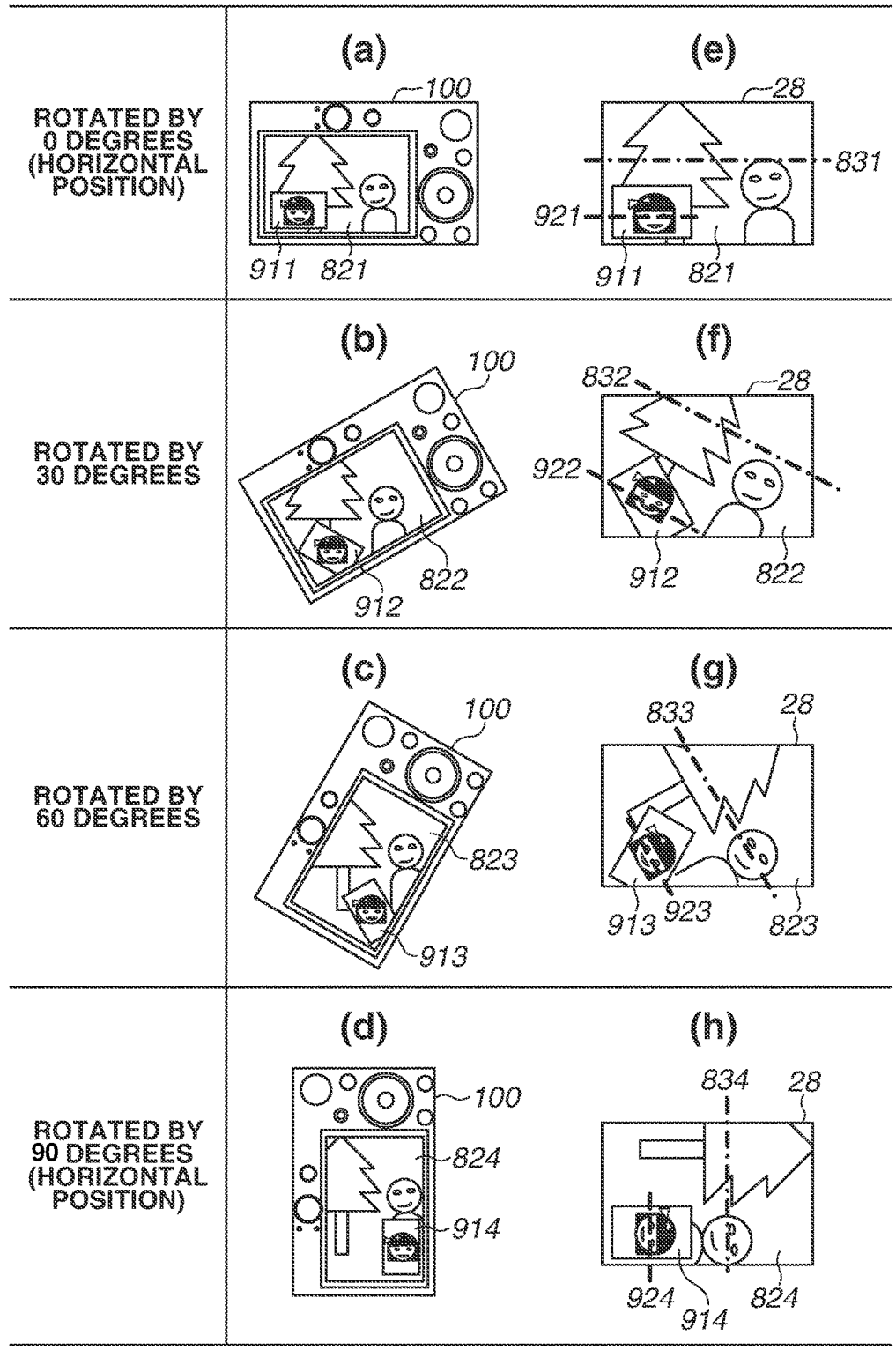
FIG. 9 illustrates states of digital camera 100 and the display unit 28 when the out-camera image and the in-camera image are displayed in the normal image display mode according to a third exemplary embodiment.

A state (a) illustrated in FIG. 9 indicates a state of the digital camera 100 located at the horizontal position where the digital camera 100 is not rotated about the optical axis (the imaging direction of the out-camera), and a display screen (e) illustrated in FIG. 9 indicates a display screen displayed on the display unit 28 when the digital camera 100 is in the state (a) illustrated in FIG. 9.

A state (b) illustrated in FIG. 9 indicates a state of the digital camera 100 when the digital camera 100 is rotated about the optical axis (the imaging direction of the out-camera) by 30 degrees in the counterclockwise direction, and a display screen (f) illustrated in FIG. 9 indicates a display screen displayed on the display unit 28 when the digital camera 100 is in the state (b) illustrated in FIG. 9.

A state (c) illustrated in FIG. 9 indicates a state of the digital camera 100 when the digital camera 100 is rotated about the optical axis (the imaging direction of the out-camera) by 60 degrees in the counterclockwise direction, and a display screen (g) illustrated in FIG. 9 indicates a display screen displayed on the display unit 28 when the digital camera 100 is in the state (c) illustrated in FIG. 9.

A state (d) illustrated in FIG. 9 indicates a state of the digital camera 100 when the digital camera 100 is rotated about the optical axis (the imaging direction of the out-camera) by 90 degrees, and a display screen (h) illustrated in FIG. 9 indicates a display screen displayed on the display unit 28 when the digital camera 100 is in the state (d) illustrated in FIG. 9.

Further, FIG. 9 illustrates in-camera images 911, 912, 913, and 914. Lines 921, 922, 923, and 924 indicate horizontal directions of the in-camera images 911, 912, 913, and 914, respectively. Similar elements to the elements illustrated in FIG. 8 are identified by the same reference numerals as the reference numerals used in FIG. 8.

Assume that, among the states and the display screens (a) to (h) illustrated in FIG. 9, no change occurs in the position of the object of the in-camera 300 and the position of the object of the out-camera similar to FIG. 8, and the rotation of the digital camera 100 about the optical axis (the imaging direction of the out-camera) causes the changes in the images displayed on the display unit 28.

In the state (b) and the display screen (f) illustrated in FIG. 9, the digital camera 100 is rotated by 30 degrees in the counterclockwise direction, but at this time, the in-camera image 912 is rotated by −60 degrees in the counterclockwise direction (60 degrees in the clockwise direction), i.e., by (the rotational angle of the digital camera 100)×(−2) [degrees]. Therefore, the horizontal direction 922 of the in-camera image 912 can match the horizontal direction 832 of the out-camera image 822, and the out-camera image 822 and the in-camera image 912 are combined and displayed with the horizontal directions 832 and 922 and the vertical states of the out-camera image 822 and the in-camera image 912 matching each other.

In the state (c) and the display screen (g) illustrated in FIG. 9, the digital camera 100 is rotated by 60 degrees in the counterclockwise direction, but at this time, the in-camera image 913 is rotated by −120 degrees in the counterclockwise direction (120 degrees in the clockwise direction), i.e., by (the rotational angle of the digital camera 100)×(−2) [degrees]. Therefore, the horizontal direction 923 of the in-camera image 913 can match the horizontal direction 833 of the out-camera image 823, and the out-camera image 823 and the in-camera image 913 are combined and displayed with the horizontal directions 833 and 923 and the vertical states of the out-camera image 823 and the in-camera image 913 matching each other.

In the state (d) and the display screen (h) illustrated in FIG. 9, the digital camera 100 is rotated by 90 degrees in the counterclockwise direction, but at this time, the in-camera image 914 is rotated by −180 degrees in the counterclockwise direction (180 degrees in the clockwise direction), i.e., by (the rotational angle of the digital camera 100)×(−2) [degrees]. Therefore, the horizontal direction 924 of the in-camera image 914 can match the horizontal direction 834 of the out-camera image 824, and the out-camera image 824 and the in-camera image 914 are combined and displayed with the horizontal directions 834 and 924 and the vertical states of the out-camera image 824 and the in-camera image 914 matching each other.

In this manner, according to the present exemplary embodiment, the digital camera 100 rotates the in-camera image by an angle minus two times as large as (the rotational angle of the digital camera 100) when combining and displaying the in-camera image as a normal image together with the out-camera image without performing the mirror image reversal on the in-camera image. As a result, the digital camera 100 can display the in-camera image and the out-camera image with the horizontal directions and the vertical directions of the in-camera image and the out-camera image matching each other.

Further, as indicated by the states (a) to (d) illustrated in FIG. 9, the in-camera image can be displayed while being kept horizontal regardless of the rotation of the digital camera 100, when the camera operator is using the digital camera 100. Next, processing performed in the present exemplary embodiment will be described with reference to FIG. 11.

FIG. 11 is a flowchart illustrating processing for combining an out-camera image and an in-camera image. The system control unit 50, for example, controls the respective units, makes a calculation, and makes a determination based on the program read out from the nonvolatile memory 51, by which this flow is realized.

First, in step S1101, the digital camera 100 detects the rotational angle of the digital camera 100 about the optical axis (the imaging direction of the out-camera) by the orientation detection sensor 44.

Next, in step S1102, the digital camera 100 performs a process for rotating the in-camera image by an angle corresponding to −2alpha by the image processing unit 20 with use of the rotational angle alpha of the digital camera 100, which is detected in step S1101. In the present exemplary embodiment, the digital camera 100 rotates the in-camera image by an angle corresponding to (the rotational angle of the digital camera 100)×(−2). However, a similar result can be acquired even by performing a process for rotating the in-camera image by an angle corresponding to <(the rotational angle of the digital camera 100)×2> in a reverse direction of a rotational direction of the digital camera 100.

Then, in step S1103, the digital camera 100 generates a combined image by superimposing and combining the in-camera image rotated by the rotation process in step S1102 onto the out-camera image that is not rotated (picture-in-picture (PinP) combination). As a position where the in-camera image is combined on the out-camera image, the digital camera 100 combines them in such a manner that a center of the in-camera image is located at a predetermined position in the out-camera image.

The digital camera 100 displays and records the combined image in a similar manner to the first exemplary embodiment and the second exemplary embodiment, with use of the combined image generated by combining the out-camera image and the in-camera image in this manner.

The present exemplary embodiment has been described based on the example in which the digital camera 100 provides a live view display by combining the in-camera image (the live view image of the in-camera 300) with the out-camera image (the live view image of the out-camera) according to the PinP combination. The digital camera 100 may perform similar processing (the rotation of the in-camera image) not only when displaying the images but also when recording the images. In the present exemplary embodiment, a region where the in-camera image is combined on the out-camera image is changed due to the rotation of the in-camera image, whereby the digital camera 100 may be configured to use the present exemplary embodiment only when displaying the images, and perform the processing according to the first exemplary embodiment or the second exemplary embodiment when recording the images.

Further, the digital camera 100 may be configured to combine the images after circularly cutting out the in-camera image as illustrated in FIG. 10 so as to prevent the change in the region where the in-camera image is combined on the out-camera image even when the in-camera image is rotated. In this case, the digital camera 100 is configured to rotate the cut circular in-camera image by an angle minus two times as large as the rotational angle of the digital camera 100, and combine the rotated in-camera image onto a specific region in the out-camera image.

Example 4

The digital camera has been described as the exemplary embodiments of the present invention by way of example, but the present invention is not limited thereto. The present invention may be realized by a mobile phone, a personal computer (PC), and the like including an imaging unit. Further, the imaging unit, the control unit, the display unit, the recording unit, and the like may be configured as different separate apparatuses, and the present invention may be realized by a system constructed by connecting these apparatuses. Further, the present invention may be carried out by combining the above-described exemplary embodiments. In other words, the present invention includes not only an imaging apparatus configured to shoot an image, but also a display control apparatus configured to control a display for displaying a captured image, and a recording apparatus configured to record a captured image.

In the above-described exemplary embodiments, at the time of imaging with use of the out-camera and the in-camera 300, the digital camera 100 also captures a still image by the in-camera 300 when capturing a still image by the out-camera, and also captures a moving image by the in-camera 300 when capturing a moving image by the out-camera. However, the digital camera 100 does not necessarily have to capture and record sill images by both the out-camera and the in-camera 300, or capture and record moving images by both the out-camera and the in-camera 300. For example, the digital camera 100 may capture a still image by the out-camera and capture a relatively short moving image continuing for several seconds by the in-camera 300 in response to a single imaging instruction (pressing of the shutter button 61). In this case, if the digital camera 100 determines that the shutter button 61 is pressed in step S209 (YES in step S209), the digital camera 100 may capture a still image by the out-camera and capture a moving image continuing for a predetermined time period by the in-camera 300, and then add the angular information to the captured still image and the captured moving image to record them in step S217.

Further, the above-described exemplary embodiments have been described based on the example in which the digital camera 100 has both the normal image display (recording) mode and the mirror image display (recording) mode. However, the digital camera 100 may be configured to display (record) the in-camera image after rotating the in-camera image by 180 degrees when the digital camera 100 is vertically orientated, in a case where the digital camera 100 has only the normal image display (recording) mode. Further, in the above-described exemplary embodiments, the digital camera 100 determines that the orientation of the digital camera 100 is the vertical orientation if the rotational angle detected by the orientation detection sensor 44 is an angle from 50 to 130 degrees or 230 to 310 degrees. However, when the digital camera 100 is in a state having a rotational angle near the threshold value (50 degrees, 130 degrees, 230 degrees, or 310 degrees) based on which the determination about whether the orientation of the digital camera 100 is the vertical orientation or the horizontal orientation is switched, the orientation of the digital camera 100 is frequently switched between the vertical orientation and the horizontal orientation due to a camera shake or a slight rotational operation. Especially, while a live view image of the in-camera 300 is displayed, the frequent switching of the determination about the vertical/horizontal orientation makes it difficult for the user to check the live view image because the live view image is displayed with its rotational angle changed every time the determination is switched. Therefore, it is desirable that the determination about the vertical/horizontal orientation is not very frequently changed. Accordingly, a difference may be made between the angle based on which the digital camera 100 determines that the orientation of the digital camera 100 is the vertical orientation when the digital camera 100 moves from the horizontal orientation to the vertical orientation, and the angle based on which the digital camera 100 determines that the digital camera 100 has returned to the horizontal orientation when the digital camera 100 returns from the vertical orientation to the horizontal orientation. For example, when the digital camera 100 moves from the horizontal orientation to the vertical orientation, the digital camera 100 determines that the orientation of the digital camera 100 is switched to the vertical orientation according to a shift of the rotational angle to an angle from 50 to 130 degrees or from 230 to 310 degrees. Then, once the orientation of the digital camera 100 is switched to the vertical orientation, the digital camera 100 may determine that the orientation of the digital camera 100 is the vertical orientation as long as the rotational angle of the digital camera 100 is an angle from 40 to 140 degrees or from 220 to 320 degrees, and determine that the orientation of the digital camera 100 is switched to the horizontal orientation when another angle is detected as the rotational angle of the digital camera 100. In this case, when the digital camera 100 moves from the horizontal orientation to the vertical orientation, the digital camera 100 determines that the orientation of the digital camera 100 is switched to the vertical orientation according to a shift of the rotational angle to 50 degrees or larger. On the other hand, when the digital camera 100 returns to the horizontal orientation, the digital camera 100 does not determine that the orientation of the digital camera 100 is switched to the horizontal orientation even with a shift of the rotational angle to 50 degrees or smaller (smaller than 50 degrees), and does not determine that the orientation of the digital camera 100 is switched to the horizontal orientation until the rotational angle shifts to 40 degrees or smaller. Therefore, even rotating the digital camera 100, as long as this rotation is slight, does not trigger switching of the determination about the vertical/horizontal orientation.

Further, in the above-described exemplary embodiments, the digital camera 100 adds the information of the rotational angle according to the orientation of the digital camera 100 to the images, and records these images. However, the digital camera 100 may be configured to record an identifier indicating each angle as the rotational information, like, for example, recording 0 when the rotational angle is 0 degrees, recording 1 when the rotational angle is 90 degrees, recording 2 when the rotational angle is 180 degrees, and recording 3 when the rotational angle is 270 degrees, instead of recording the angle.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2013-267155 filed Dec. 25, 2013, and No. 2014-210839 filed Oct. 15, 2014, which are hereby incorporated by reference herein in their entirety.

The invention claimed is:

1. An imaging apparatus comprising:
a first imaging device;
a second imaging device, wherein an imaging capturing direction of the second imaging device is oriented in a substantially opposite direction to an image capturing direction of the first imaging device;
a detector configured to detect an orientation of the imaging apparatus;
one or more processors, and
one or more memories storing instructions which, when executed by the one or more processors, cause the imaging apparatus to perform control for displaying an image captured by the first imaging device and an image captured by the second imaging device on a display,
wherein the control is performed so that the image captured by the second imaging device being rotated by substantially 180 degrees and the image captured by the first imaging device not being rotated are displayed if the orientation detected by the detector indicates that the imaging apparatus is rotated by substantially 90 degrees or substantially 270 degrees around an axis substantially parallel to the optical axis of the first imaging device, in a case where the image captured by the second imaging device is displayed together with the image captured by the first imaging device, without the image captured by the second imaging device being reversed by a mirror image reversal.

2. The imaging apparatus according to claim 1, wherein the control is performed so that the image captured by the second imaging device is displayed after being rotated by substantially 180 degrees, in a case where the image captured by the second imaging device is displayed after being rotated.

3. The imaging apparatus according to claim 1, further comprising a display mode setting device configured to switch a first display mode of displaying the image captured by the second imaging device without performing the mirror image reversal on the image captured by the second imaging device, and a second display mode of displaying the image captured by the second imaging device after performing the mirror image reversal on the image captured by the second imaging device.

4. The imaging apparatus according to claim 3, wherein the control is performed so that the image captured by the second imaging device is displayed after being rotated if the orientation of the imaging apparatus is detected to be the predetermined orientation in the first display mode, and the control is performed so that the image captured by the second imaging device is displayed without being rotated if the orientation of the imaging apparatus is detected to be the predetermined orientation in the second display mode.

5. The imaging apparatus according to claim 1, further comprising the display,
wherein the display is disposed on a surface of the imaging apparatus that corresponds to the image capturing direction of the second imaging device.

6. The imaging apparatus according to claim 1, wherein the control is performed so that the image captured by the second imaging device is displayed after being rotated if the orientation of the imaging apparatus is detected to be a substantially vertical orientation in which the imaging apparatus is rotated by substantially 90 degrees or substantially 270 degrees around an axis substantially parallel to the optical axis of the first imaging device, when the image captured by the second imaging device is displayed without being reversed by the mirror image reversal.

7. The imaging apparatus according to claim 6, wherein the detector determines that the orientation of the imaging apparatus is changed from a substantially horizontal orientation to the substantially vertical orientation according to exceedance of a rotation angle over a first angle, the rotation angle representing an amount that the imaging apparatus is rotated around an axis substantially parallel to the optical axis of the first imaging device, and after rotation of the imaging apparatus to achieve the rotation angle, the detector determines that the orientation of the imaging apparatus is changed from the substantially vertical orientation to the substantially horizontal orientation according to a shift of the rotation angle to a second angle smaller than the first angle.

8. The imaging apparatus according to claim 6, wherein the detector determines that the orientation of the imaging apparatus is changed from a substantially horizontal orientation to the substantially vertical orientation according to exceedance of a rotation angle of the imaging apparatus over a predetermined angle, the rotation angle representing an amount that the imaging apparatus is rotated around an axis substantially parallel to the optical axis of the first imaging device, and after rotation of the imaging apparatus to achieve the rotation angle, the detector determines that the orientation of the imaging apparatus is changed to the substantially horizontal orientation according to continuance of a state in which the rotation angle of the imaging apparatus is the predetermined angle or smaller for a predetermined time period.

9. An imaging apparatus comprising:
a first imaging device;
a second imaging device, wherein an imaging capturing direction of the second imaging device is oriented in a substantially opposite direction to an image capturing direction of the first imaging device;
a detector configured to detect an orientation of the imaging apparatus;
one or more processors, and
one or memories storing instructions which, when executed by the one or more processors, cause the imaging apparatus to perform control for combining and recording an image captured by the first imaging device and an image captured by the second imaging device into a recording medium,
wherein the control is performed so that the image captured by the second imaging device being rotated by substantially 180 degrees and the image captured by the first imaging device not being rotated are combined if the orientation detected by the detector indicates that the imaging apparatus is rotated by substantially 90 degrees or substantially 270 degrees around an axis substantially parallel to the optical axis of the first imaging device, in a case where the image captured by the second imaging device is recorded after being combined with the image captured by the first imaging device, without the image captured by the second imaging device being reversed by a mirror image reversal.

10. The imaging apparatus according to claim 9, wherein the control is performed so that the image captured by the second imaging device is combined with the image captured by the first imaging device after the image captured by the second imaging device is rotated by substantially 180 degrees, in a case where the image captured by the second imaging device is combined after being rotated.

11. The imaging apparatus according to claim 9, further comprising a recording mode setting device configured to switch a first recording mode of recording the image captured by the second imaging device without performing the mirror image reversal on the image captured by the second imaging device, and a second recording mode of recording the image captured by the second imaging device after performing the mirror image reversal on the image captured by the second imaging device.

12. The imaging apparatus according to claim 9, wherein the control unit is performed so that the image captured by the second imaging device is combined with the image captured by the first imaging device after the image captured by the second imaging device is rotated if the orientation of the imaging apparatus is detected to be the predetermined orientation in a case where the image captured by the second imaging device is recorded after being combined with the image captured by the first imaging device without being reversed by the mirror image reversal, and the control is performed so that the image captured by the second imaging device is combined without being rotated even if the orientation of the imaging apparatus is detected to be the predetermined orientation in a case where the image captured by the second imaging device is recorded after being combined with the image captured by the first imaging device after being reversed by the mirror image reversal.

13. An imaging apparatus comprising:
an imaging device configured to image an object on a camera operator side;
a detector configured to detect an orientation of the imaging apparatus;
one or more processors; and
one or more memories storing instructions which, when executed by the one or more processors, cause the imaging apparatus to
perform control so that an image captured by the imaging device is displayed without being rotated in a case that the imaging apparatus is detected to have an orientation being not rotated and an image captured by the imaging device is displayed after being rotated by substantially 180 degrees in a case that the imaging apparatus is detected to have an orientation rotated by substantially 90 degrees or substantially 270 degrees.

14. The imaging apparatus according to claim 13,
wherein the performing control includes selecting a first display mode of displaying the image captured by the imaging device without performing a mirror image reversal on the image, and a second mode of displaying the image captured by the imaging device after performing the mirror image reversal on the image, and
wherein the control is performed so that the image captured by the imaging device is displayed after being rotated according to the orientation of the imaging apparatus based on a result of detection by the detector in the first mode, and the control is performed so that the image captured by the imaging device is displayed without being rotated in the second mode.

15. The imaging apparatus according to claim 13, further comprising another imaging device different from the imaging device, configured to image an object on an opposite side of the imaging apparatus to the camera operator side.

16. The imaging apparatus according to claim 13, further comprising a display on a surface of the imaging apparatus that corresponds to the image capturing direction of the imaging device,
wherein the control is performed so that the image captured by the imaging device is displayed on the display.

17. A method for controlling a display control apparatus configured to cause a display for displaying an image captured by a first imaging device and an image captured by a second imaging device, wherein an imaging capturing direction of the second imaging device is oriented in a substantially opposite direction to an image capturing direction of the first imaging device, the method comprising:

determining an orientation of the first imaging device or the second imaging device; and controlling the display control apparatus to cause the display to display the image captured by the first imaging device and the image captured by the second imaging device, wherein the display control apparatus is controlled so that the image captured by the second imaging device being rotated by substantially 180 degrees and the image captured by the first imaging device not being rotated are displayed if the determined orientation indicates rotation by substantially 90 degrees or substantially 270 degrees around an axis substantially parallel to the optical axis of the first imaging device, in a case where the image captured by the second imaging device is displayed, together with the image captured by the first imaging device, without the image captured by the second imaging device being reversed by a mirror image reversal.

18. A non-transitory computer-readable storage medium storing a program for causing a computer to perform the method for controlling the display control apparatus according to claim 17.

* * * * *